United States Patent
Batten, Jr.

(10) Patent No.: US 7,065,961 B1
(45) Date of Patent: Jun. 27, 2006

(54) EXHAUST SYSTEM WITH AN INTEGRAL MOISTURE TRAP

(75) Inventor: Cyril J. Batten, Jr., Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 100 days.

(21) Appl. No.: 10/842,193

(22) Filed: May 10, 2004

(51) Int. Cl.
*F01N 3/02* (2006.01)

(52) U.S. Cl. ............ 60/309; 60/298; 60/320; 60/321; 440/88 G; 440/88 J; 440/89 B; 440/89 C; 440/89 E; 440/89 F

(58) Field of Classification Search ............ 60/272, 60/298, 310, 320, 321, 323, 324, 309; 440/88, 440/89, 88 C, 88 D, 88 G, 88 J, 89 B, 89 C, 440/89 E, 89 F
See application file for complete search history.

(56) References Cited

U.S. PATENT DOCUMENTS

| 3,921,398 | A | * | 11/1975 | Kashmerick | 60/310 |
|---|---|---|---|---|---|
| 4,997,399 | A | * | 3/1991 | Nakayasu et al. | 440/89 F |
| 5,109,668 | A | * | 5/1992 | Lindstedt | 60/310 |
| 5,133,185 | A | | 7/1992 | Gilbreath et al. | 60/309 |
| 5,590,523 | A | | 1/1997 | Fox | 60/307 |
| 5,733,157 | A | * | 3/1998 | Okuzawa et al. | 440/89 R |
| 6,290,558 | B1 | * | 9/2001 | Erickson | 440/89 R |
| 6,478,645 | B1 | | 11/2002 | Allbright et al. | 440/89 |
| 6,648,338 | B1 | | 11/2003 | Jaeger et al. | 277/591 |
| 6,652,337 | B1 | | 11/2003 | Logan et al. | 440/88 J |

* cited by examiner

*Primary Examiner*—Binh Q. Tran
(74) *Attorney, Agent, or Firm*—William D. Lanyi

(57) ABSTRACT

A moisture trap is formed as an integral part of the wall of an exhaust conduit. Tapered surfaces can be provided to direct condensate downwardly and into a reservoir of the moisture trap where the moisture is retained until the temperature of the exhaust system reaches adequate magnitudes to evaporate the water and conduct it out of the exhaust system along with the exhaust gases.

5 Claims, 4 Drawing Sheets

EXHAUST SYSTEM WITH AN INTEGRAL MOISTURE TRAP

BACKGROUND OF THE INVENTION

1. Field of the Invention

The present invention is generally related to an exhaust system and, more particularly, to an exhaust system for a marine propulsion device in which an integral moisture trap is formed in the walls of an exhaust system component so that condensation is trapped in a reservoir for later evaporation and removal when the exhaust system reaches its normal operating temperatures.

2. Description of the Prior Art

It is well known that water can condense within or flow into the exhaust system of a marine propulsion device. The condensation can flow, under the influence of gravity, into an exhaust manifold and then toward the exhaust valves of an internal combustion engine. This condensation can be harmful to an internal combustion engine.

Those skilled in the art of marine propulsion systems are aware of several devices that have been developed to address the problem of water condensation in exhaust components.

U.S. Pat. No. 5,133,185, which issued to Gilbreath et al. on Jul. 28, 1992, describes an anti-moisture device for an engine exhaust. The device is intended to remove moisture droplets from an interior surface of a duct, characterized by an outer edge secured to the interior surface of the duct, an inner edge surrounding an opening, and a connecting wall between the outer edge and inner edge. The inner edge of the anti-moisture device is positioned closer to a downstream end of the duct than the outer edge whereby the connecting wall is positioned at an angle relative to the interior surface of the duct. Moisture droplets traveling upstream will be caught between the connecting wall and the interior surface of the duct, on the downstream side of the device. The connecting wall is dimensioned so that a turbulent disturbance will be created along the interior surface of the duct whereby moisture droplets will be removed. The anti-moisture device is preferably made of a thermally conductive material so that moisture droplets contacting the device will be flashed into steam, or vaporized.

U.S. Pat. No. 6,652,337, which issued to Logan et al. on Nov. 25, 2003, discloses an exhaust system for a marine propulsion engine. The invention provides a relationship between the exhaust passages and coolant passages of the exhaust manifold and exhaust elbow which serves to maintain the joint of the exhaust passage at a higher temperature than would be possible with known exhaust manifolds and exhaust elbows. By providing a space between the surfaces of a raised exhaust portion of the components and surfaces of the raised coolant portions of the exhaust system, leakage from the coolant conduits to the exhaust cavities is avoided. The space provided between the exhaust portions of the manifold and elbow and coolant portions of the manifold and elbow, near the joint between these components, provides the two advantages of maintaining a higher exhaust connection between the manifold and elbow and also preventing coolant leakage from flowing from the coolant passages to the exhaust passages of the exhaust system.

U.S. Pat. No. 6,478,645, which issued to Allbright et al. on Nov. 12, 2002, describes a moisture migration inhibitor for wet marine exhausts. A moisture inhibitor system for wet exhausts as utilized in marine applications, such as boats and other watercraft, is described. The preferred embodiment of the invention contemplates an exhaust manifold having an inner exhaust passage which has situated therein a collection barrier or raised pocket situated to collect moisture migrating from the exhaust port, generally at the stern of the vessel. The collection pocket is heated by the exhaust stream and is formed to collect and retain the migrating moisture while simultaneously the heated walls of the collection barrier evaporate the collected moisture forming moisture vapor which moisture vapor is urged through the exhaust passage and the exhaust port, where it leaves the system. The system thereby prevents moisture migrating up the exhaust passage from reaching the engine. In the preferred embodiment of the invention, the exhaust pipe includes a generally vertical portion emanating from the engine and an elbow at the top of the vertical portion communicating with an exhaust conduit situated generally horizontally, but with a slightly downwardly angled path leading to the exhaust port at the stern of the vessel. In this embodiment, the moisture collection pocket is situated in the lower inner portion of the generally horizontal exhaust conduit, in the vicinity of the elbow. The collection pocket is configured so as to provide minimal disturbance in the flow of exhaust through the system. An alternative embodiment of the device contemplates a moisture collection pocket formed inside portion of the manifold elbow near the manifold opening at the engine head.

U.S. Pat. No. 5,590,523, which issued to Fox on Jan. 7, 1997, describes a flow focusing and mixing device. The invention is a flow focusing and mixing device for use with internal combustion engines. The flow focusing and mixing device may be located in the exhaust stream of an internal combustion engine for increased oxidization of the exhaust, increasing the air quality of the exhaust released into the environment.

U.S. Pat. No. 6,648,338, which issued to Jaeger et al. on Nov. 18, 2003, discloses an exhaust gasket with individually sealed water passages. The gasket is for use with an exhaust system and comprises a metallic plate having an exhaust sealing segment and a coolant sealing segment which is attached to and extends from the exhaust sealing segment. Both segments have first and second planar surfaces on opposite sides thereof, with the first and second planar surfaces of the exhaust sealing segment being coplanar with the first and second planar surfaces of the coolant sealing segment, respectively. An exhaust opening is formed through the plate and first and second elastomeric seals, which can be silicone rubber and which are both integral parts of a common elastomeric element, are disposed on the first and second surfaces, respectively, of the cooling sealing segment. A raised portion of the exhaust opening through the metal plate extends at an angle from the exhaust sealing segment and away from the first surface to form a transition segment from the first opening to a second. A hole can be formed through the plate and located at a central region of the coolant sealing segment with the common elastomeric element extending through the hole with the first and second elastomeric seals being joined to each other within the hole. A central portion of the coolant sealing segments can either comprise a hole to allow liquid to flow through the thickness of the plate, or alternatively, can comprise a solid portion that inhibits a flow of liquid through the thickness of the plate.

The patents described above are hereby expressly incorporated by reference in the description of the present invention.

Known solutions to the problem of condensation on the walls of an exhaust system typically require assembly of a number of parts, such as the device described in U.S. Pat.

No. 5,133,185. This requires additional expense and assembly time during the manufacture of a marine propulsion system. In addition, concepts similar to the ones described in U.S. Pat. Nos. 5,133,185 and 6,478,645 can adversely affect the efficient flow of exhaust gases through the various conduits of the exhaust system. By protruding into the exhaust gas stream, the overall efficiency of the engine operation can be deleteriously affected. It would therefore be significantly beneficial if a system could be provided for a marine engine exhaust which does not adversely affect the efficiency of flow of exhaust gases through the exhaust system and, additionally, which does not require separate components to be assembled in conjunction with the conduits of the exhaust system.

SUMMARY OF THE INVENTION

An exhaust system made in accordance with the present invention comprises an exhaust conduit connected in fluid communication with an engine, with the exhaust conduit having a central axis. A wall of the exhaust conduit has an internal surface which is shaped to direct exhaust gases away from the engine and a reservoir is formed as an integral portion of the exhaust conduit, with the reservoir being shaped to receive water which flows under the influence of gravity on the internal surface of the exhaust conduit.

In a preferred embodiment of the present invention, the reservoir has an inner wall surface and an outer wall surface. The inner and outer wall surfaces are generally parallel to each other. In one embodiment, the inner and outer wall surfaces are each generally rectangular and generally coaxial with the central axis of the internal surface of the exhaust conduit. The inner wall surface of the reservoir can be displaced radially outward from the internal surface of the exhaust conduit. The internal surface of the exhaust conduit can be tapered to extend downwardly and radially outward from the central axis to form a surface that extends from the internal surface to the outer wall surface.

In certain embodiments of the present invention, the exhaust conduit can be a portion of the exhaust manifold and in other embodiments the exhaust conduit can be a portion of an exhaust elbow or riser. The exhaust conduit can be generally tubular and the internal surface can be generally rectangular in cross section, but it can also be circular. The reservoir is formed in a thickness of the wall of the exhaust conduit in a preferred embodiment of the present invention and is displaced radially outward from the internal surface of the exhaust conduit.

In a particularly preferred embodiment of the present invention, it further comprises an exhaust system component, such as an exhaust elbow or exhaust manifold, which is attached to the exhaust conduit at a separating plane which is generally coplanar with a first surface of the exhaust conduit and a second surface of the exhaust system component. The reservoir is disposed in non-intersecting relation with the separating plane. The reservoir can be generally annular in shape in a preferred embodiment of the present invention and coaxial with the central axis of the exhaust conduit.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
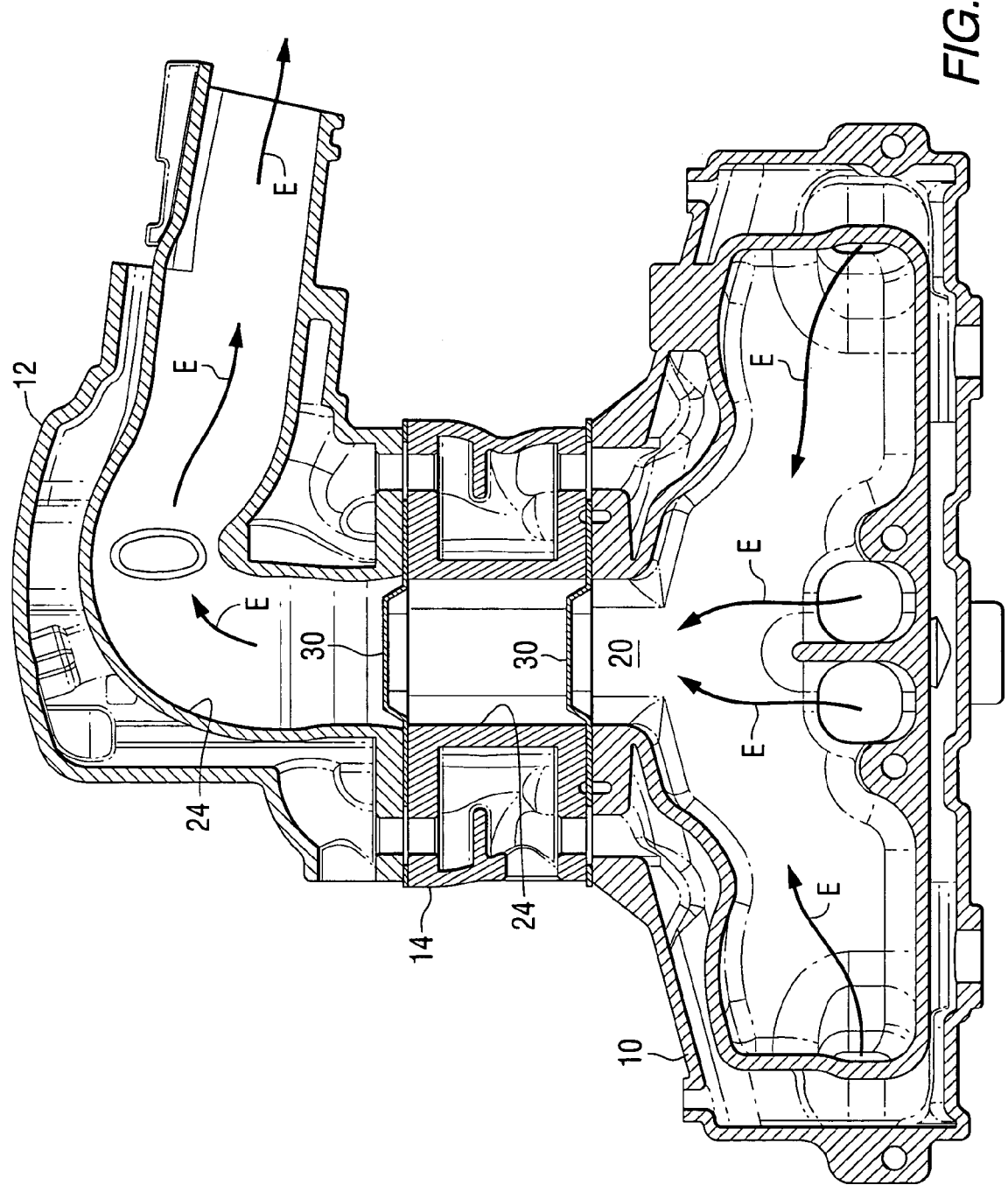
FIG. 1 shows an exhaust system which incorporates an exhaust manifold, a riser, an exhaust elbow, and two known types of moisture traps.

Throughout the description of the preferred embodiment of the present invention, like components will be identified by like reference numerals.

FIG. 1 shows several exhaust components attached together and associated with a marine propulsion system. An exhaust manifold 10 and an exhaust elbow 12 are shown with a riser 14 connected between them. One of the functions of the riser 14 is to raise the exhaust elbow 12 relative to the exhaust manifold 10. The exhaust gases E pass from the exhaust valves of an engine and are directed toward a common passage which is identified by reference numeral 20. The exhaust gases pass upwardly through the riser 14 and through the exhaust elbow 12.

As is generally known to those skilled in the art, moisture can condense on the inner walls 24 of the exhaust elbow 12 and the riser 14. If this condensation is allowed to freely move downwardly, under the influence of gravity, toward the exhaust valves of the engine, improper operation of the engine and damage to the engine may result. Reference numeral 30 illustrates a moisture trapping plate which is generally similar to the one described in U.S. Pat. No. 5,133,185, which is discussed above. As the condensate flows downwardly along the walls 24, the acute angle described by the moisture trapping plate 30 collects the moisture and prevents it from flowing downwardly toward the exhaust valves of the engine. When the exhaust system eventually reaches its normal operating temperature, the moisture collected by the moisture traps 30 is heated and vaporized. This vaporized water then travels upwardly with the exhaust gases E and exits from the system.

With continued reference to FIG. 1, it can be seen that the system disclosed in U.S. Pat. No. 6,652,334, as described above, and the system disclosed in U.S. Pat. No. 6,648,338, also described above, are variations of the moisture trapping system described in U.S. Pat. No. 5,133,185.

Two disadvantages are inherent in a system such as that illustrated in FIG. 1. First, the moisture traps 30 must be individually assembled between the manifold 10 and the riser 14 and between the riser 14 and the exhaust elbow 24. In addition to the cost of the moisture traps 30, there is assembly time and cost involved in manufacturing the system shown in FIG. 1. Furthermore, since the moisture traps 30 are inserted between individual components, it is necessary to assure that a proper seal is maintained to prevent leakage of exhaust gases and liquids at the joints between these three components illustrated in FIG. 1. Another disadvantage of the system shown in FIG. 1 is that the moisture traps 30 extend radially inwardly into the exhaust passage and necessarily obstruct a portion of the exhaust flow through that passage. This obstruction in the exhaust passage can have a detrimental effect on the operation of the engine. The operational efficiency of the engine can therefore be adversely affected. The present invention is intended to replace the system shown in FIG. 1 and avoid the inherent disadvantages of that system.

Figure 3:
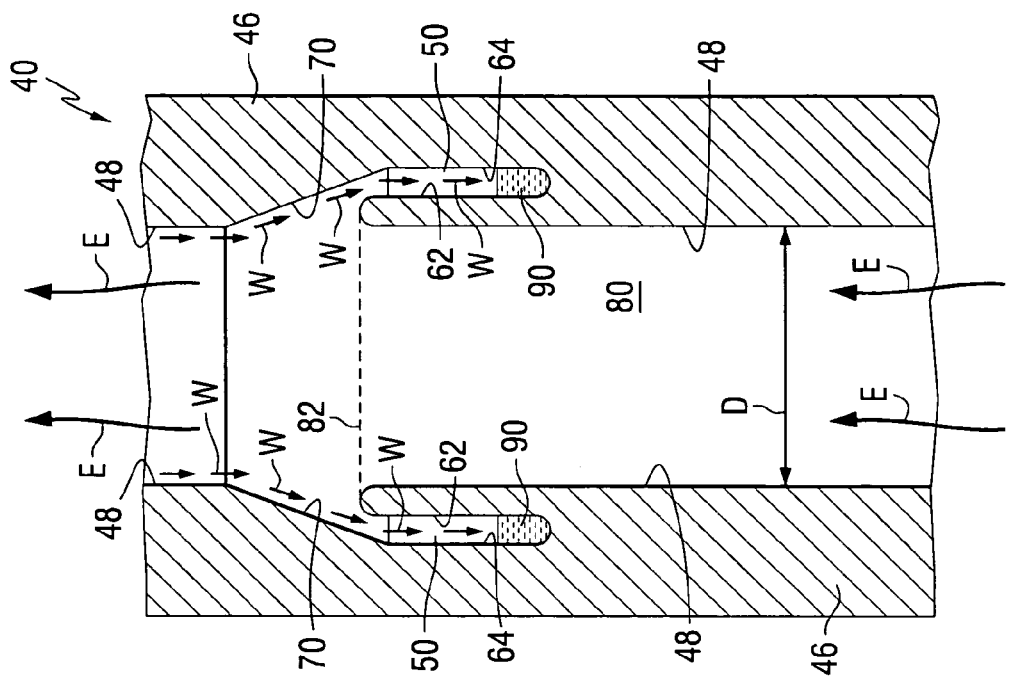
FIGS. 2 and 3 are simplified schematic representations of the present invention.
Figure 2:
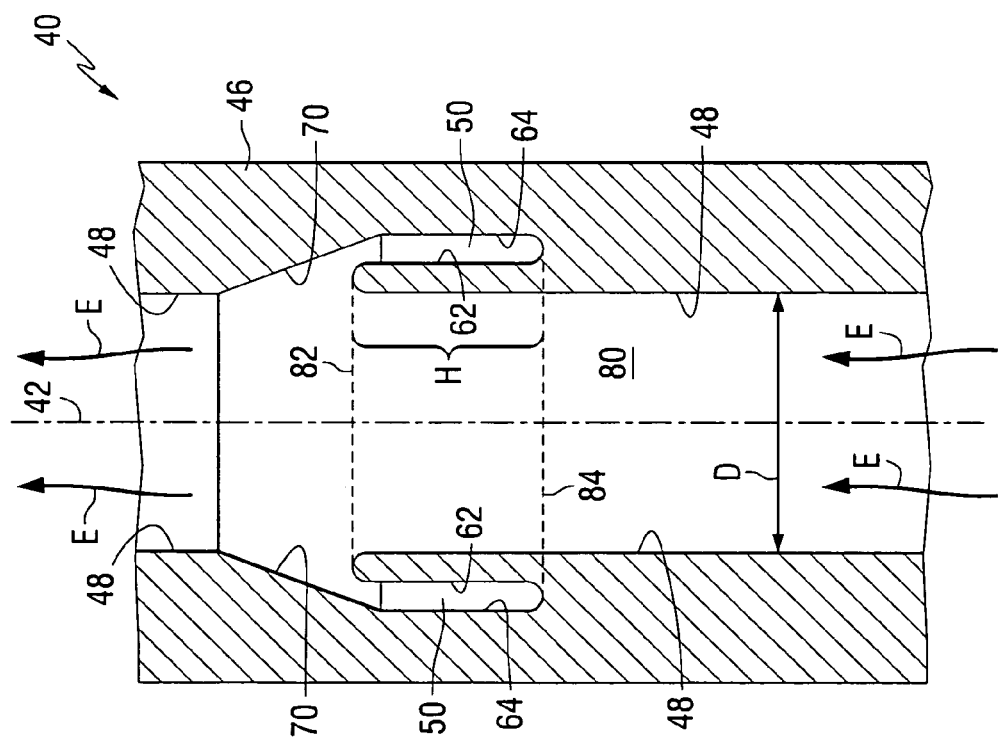

FIGS. 2 and 3 are simplified representations of the present invention which are intended to show its basic structure and function. In FIG. 2, an exhaust conduit 40 is shown. It has a central axis 42. A wall 46 of the exhaust conduit 40 has an internal surface 48 which is shaped to direct exhaust gases E away from the engine. A reservoir 50 is formed as an integral portion of the exhaust conduit 40 and is shaped to receive water condensation which flows downwardly, under the effect of gravity, on the internal surface 48 of the exhaust conduit 40.

It should be understood that the internal opening of the exhaust conduit 40 through which the exhaust gases E pass can be circular in cross section but is typically rectangular in shape, with rounded corners. This characteristic is illustrated in FIG. 1. The central opening of the moisture trap described in U.S. Pat. No. 5,133,185 is illustrated as being generally circular and intended to be used with a circular exhaust conduit passage. However, the adaptation of the moisture trap which is illustrated in U.S. Pat. No. 6,652,337 has a generally rectangular central opening of the exhaust manifold, exhaust elbow, and moisture trap plate which is generally rectangular and through which the exhaust gases pass. This is also true of the exhaust system shown in U.S. Pat. No. 6,648,338. Although the present invention is easily adaptable to exhaust systems with cylindrical exhaust passages, a preferred embodiment of the present invention will be described as being shaped to conform to a generally rectangular exhaust passageway which has rounded corners to facilitate its formation through a metal casting process.

In applications, as described above, in which the central exhaust passage is generally rectangular in cross section with rounded corners, the reservoir 50 comprises four generally straight portions which are joined to each other in a manner that conforms with the rounded corners of the exhaust passage.

With continued reference to FIG. 2, the reservoir has an inner wall surface 62 and an outer wall surface 64. In a preferred embodiment, the inner and outer wall surfaces, 62 and 64, are generally parallel to each other. The inner and outer wall surfaces, 62 and 64, are also generally rectangular when viewed in cross section and coaxial with the central axis 42 of the internal surface 48. In the description of the preferred embodiment of the present invention, the central axis 42 is used to define the approximate geometric center of the cross section of the passage through which the exhaust gases E pass. It should be understood, however, that the use of a central axis 42 in the description of the preferred embodiment of the present invention is for convenience and clarity and is not intended to imply a limitation to the present invention.

With continued reference to FIG. 2, it can be seen that the inner wall surface 62 of the reservoir 50 is displaced radially outward from the internal surface 48 of the exhaust conduit 40. In other words, the inner wall surface 62 is farther from the central axis 42 than the internal surface 48 of the passage through which the exhaust gases E flow.

The internal surface 48 in a preferred embodiment of the present invention is tapered, as represented by portion 70, in a downward direction and radially outward from the central axis 42 to form a surface which is generally the shape of a frustum of a pyramid that extends from the internal surface 48 above the reservoir 50 to the outer wall surface 64 of the reservoir 50. This tapered surface 70 conducts water that flows downwardly along the internal surface 48 under the influence of gravity and directs it into the reservoir 50.

Several characteristics of the present invention can be seen in the simplified illustration of FIG. 2. Most importantly, the reservoir 50 is formed as an integral portion of the exhaust conduit 40. It can be cast in place during the manufacture of the exhaust conduit 40 or, alternatively, it can be machined. Another important feature of the present invention is that the size of the internal passage 80, which is represented by dimension D, is not decreased as a result of the existence of the reservoir 50. The exhaust gases E flowing upwardly through the exhaust conduit 40 are not restricted as a result of the reservoir 50. The dimension D is not reduced as the gases E flow upwardly past the reservoir 50. As a result, the integral nature of the reservoir 50, formed within the exhaust conduit 40, successfully addresses one of the inherent disadvantages of the use of a moisture trap similar to the ones shown in FIG. 1 or those described in U.S. Pat. Nos. 5,133,185 and 6,652,337. Whereas the prior art moisture traps extend into the exhaust passage 80, the reservoir 50 of the present invention is located radially outward from the internal surface 48 of the exhaust passage 80.

The present invention also successfully addresses the other inherent disadvantage of the separate moisture trap plates described in conjunction with the prior art. By providing an integral reservoir 50, the assembly process relating to the moisture trap is eliminated.

In FIG. 2, the present invention is shown in conjunction with an exhaust conduit 40 that is illustrated as a generally straight section of an exhaust passage component. However, it should be understood that the concepts of the present invention, with its reservoir 50, can be incorporated in the riser 14, the exhaust manifold 10, or the exhaust elbow 12 which are illustrated in FIG. 1. The exhaust conduit 40, therefore, can be a portion of the exhaust manifold, the exhaust elbow, or the riser.

With continued reference to FIG. 2, it should be understood that the internal surface 48 can be generally rectangular in cross section in a preferred embodiment of the present invention. The reservoir 50 is formed in a thickness of the wall 46 of the exhaust conduit 40. The reservoir 50 is displaced radially outward from the internal surface 48 of the exhaust conduit 40. This simply means that the reservoir 50 is located further from the central axis 42 than the internal surface 48. As described above, the reservoir 50 is generally annular in shape in a preferred embodiment of the present invention and is generally coaxial with the central axis 42. In applications where the exhaust passage 80 is generally rectangular in cross section, this results in the reservoir 50 being a four sided, generally rectangular, annular moisture trap that is formed as an integral part within the thickness of the walls of an exhaust conduit 40. In FIG. 2, the height H of the reservoir 50 is defined between dashed lines 82 and 84.

FIG. 3 is generally similar to FIG. 2, but with arrows W shown to represent the direction that water condensate flows along the internal surface 48 of the exhaust passage 80 under the influence of gravity. It can be seen in FIG. 3 that the tapered surface 70 directs the condensate into the reservoir 50. In the reservoir 50, the water 90 is collected until the temperature of the exhaust conduit 40 exceeds the temperature of vaporization, at which time the water 90 is evaporated and conducted out of the exhaust conduit 40 with the exhaust gases E. It should be understood that the downward flow of water W generally occurs prior to the flow of exhaust gases E and prior to the exhaust conduit 40 reaching a temperature sufficiently high to vaporize the water 90.

Figure 4:
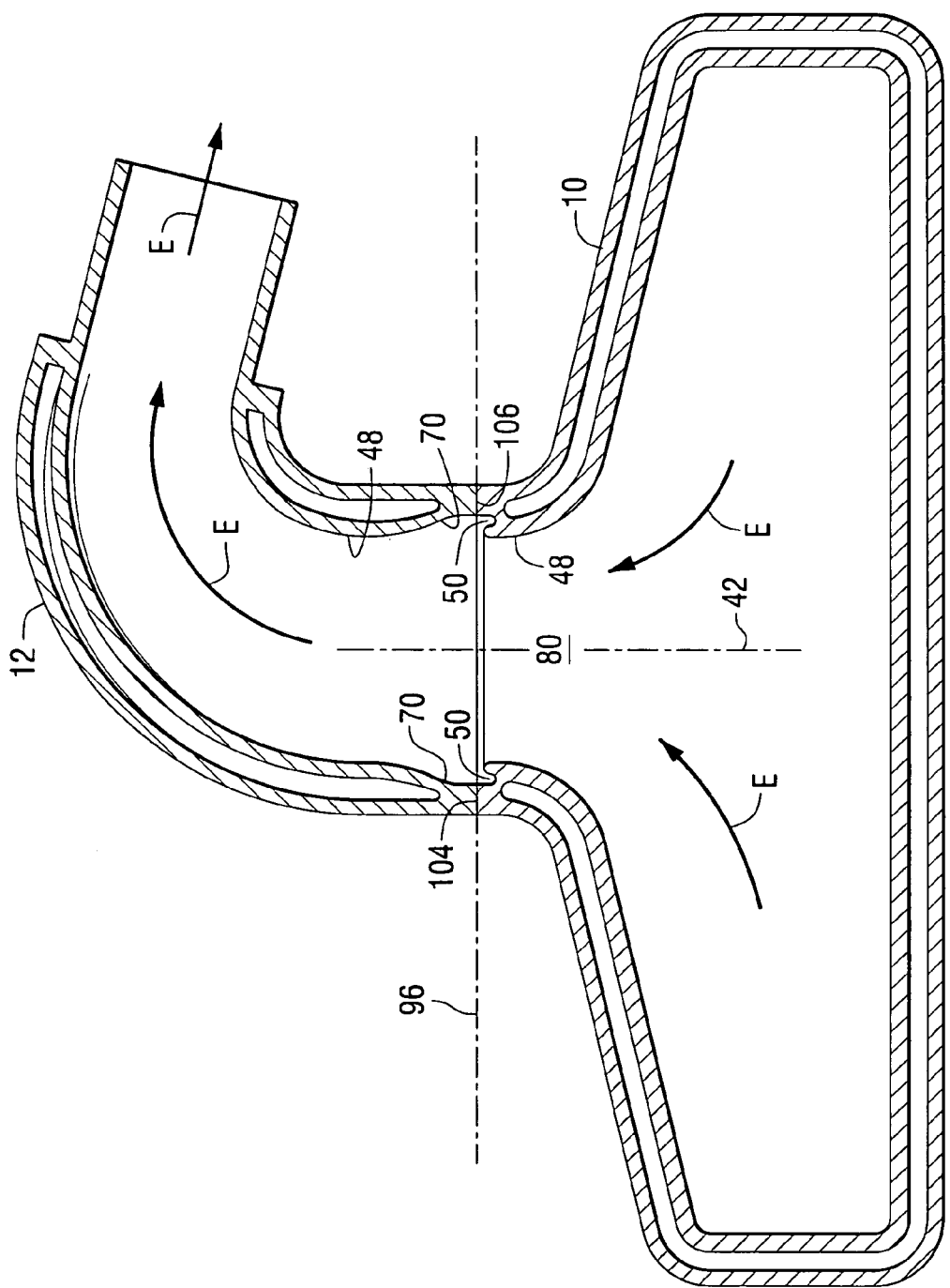
FIG. 4 shows the concepts of the present invention incorporated in an exhaust system that comprises an exhaust manifold, and an exhaust elbow.

FIG. 4 shows the concepts of the present invention incorporated in an exhaust system that comprises an exhaust manifold 10 and an exhaust elbow 12. The illustration in FIG. 4 is a section view of an exhaust system. It represents an exhaust passage 80 that is generally rectangular in cross section. As described above, it can be seen that the integral nature of the reservoirs 50 in combination with the tapered surfaces 70, eliminate restrictions to the flow of exhaust gases E.

FIG. 4 shows another important characteristic of a preferred embodiment of the present invention. If the manifold 10 is considered to be the exhaust conduit of the present invention, the embodiment in FIG. 4 shows an exhaust system component, such as the exhaust elbow 12, attached to the exhaust conduit (i.e. the manifold 10) at a separating plane. In FIG. 4, the separating plane is identified by reference numeral 96. The separating plane 96 is coplanar with a first surface 104 of the exhaust manifold and a second surface 106 of the exhaust elbow 12. The reservoir 50 is disposed in nonintersecting relation with the separating plane 96.

With continued reference to FIG. 4, the above description is intended to emphasize the fact that the first surface 104 of the exhaust manifold is placed in coplanar association with a second surface 106 of the exhaust elbow and these two surfaces define a separating plane 96. Since the separating plane 96 is in nonintersecting relation with the reservoir 50, the likelihood of leakage of water is significantly reduced and the complexity of the sealing process at the separating plane 96 is significantly simplified.

Figure 5:
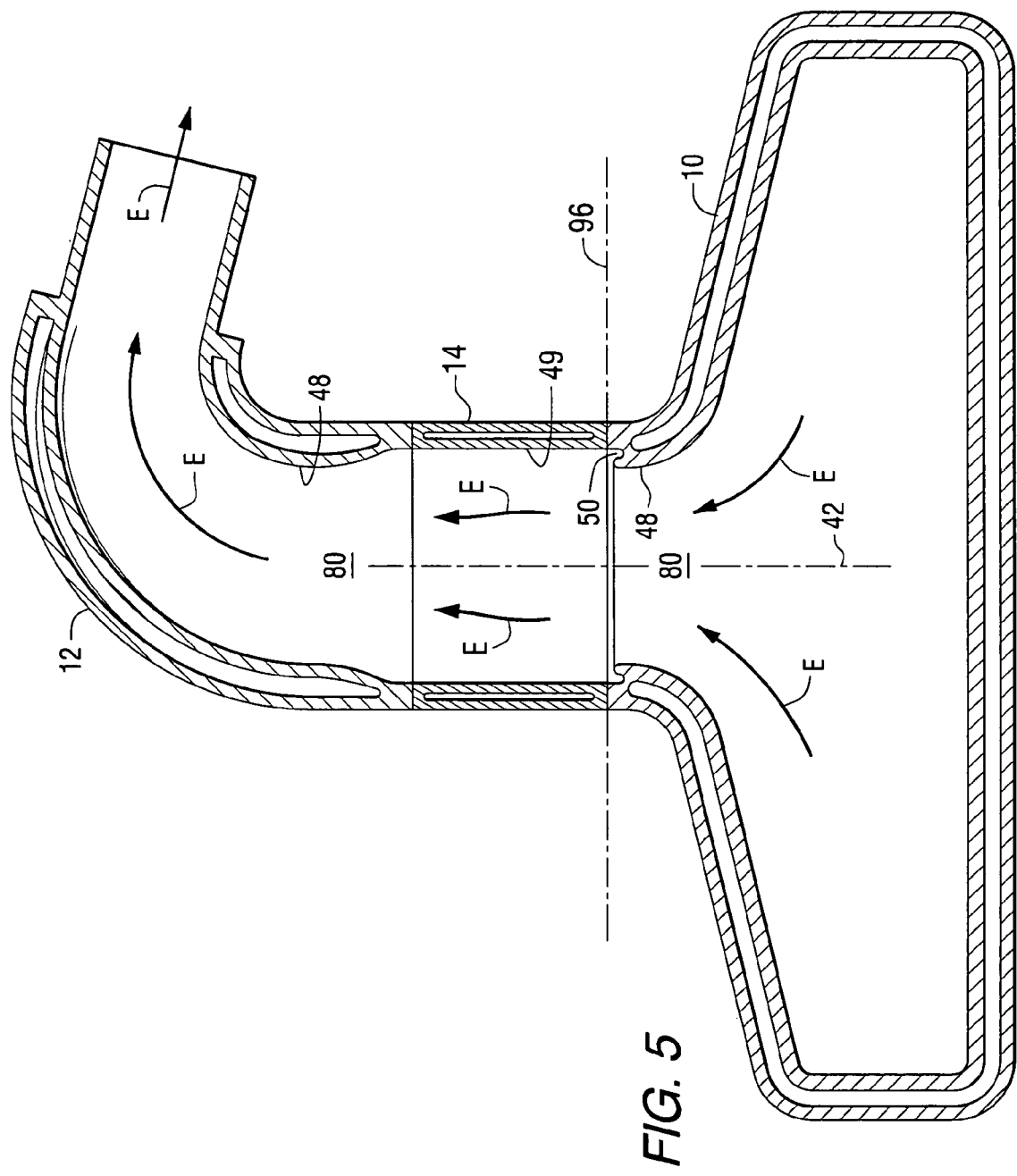
FIG. 5 shows the concepts of the present invention incorporated in an exhaust system, but without the taper above the reservoir and without the reservoir being spaced within the basic structure of the wall of an exhaust conduit.

FIG. 5 is generally similar to FIG. 4, but with the reservoir 50 not being radiately displaced from the internal surface 48 in the same way that it is shown in FIG. 4. In other words, the tapered portion 70 is not located directly above the reservoir 50. Unlike FIG. 4, which does not show a riser 14, the assembly in FIG. 5 comprises a riser 14 that is shaped to have a slightly greater dimension between opposing internal surfaces 49 than the corresponding dimension between opposing internal surfaces 48 of both the manifold 10 and elbow 19. As a result, the restriction of flow of the exhaust gases E is avoided, like the embodiment shown in FIG. 4, but in a slightly different way. The reservoir 50 in FIG. 5 is offset from the central axis 42 by a greater amount than is the internal surface 48 of the elbow 10 in the region immediately below the reservoir 50. However, the internal surface 49 of the riser 14 is formed to be radiately outward from the most proximate portions of the internal surfaces 48 of either the manifold 10 or the elbow 12. Therefore, the tapered surface portion 70 described above in conjunction with FIG. 4 is not required. As the exhaust gases pass upwardly through the region identified by reference numeral 80, these gases actually experience an enlarged cross sectional area of the riser 14.

FIGS. 4 and 5 show two embodiments of the present invention which both form the reservoir 50 as an integral part of the wall of an exhaust conduit and avoid the reduction in cross sectional area of the passage through which the exhaust gases must flow.

As described above, the present invention provides an integral reservoir formed in the wall of an exhaust conduit to confine a moisture trap that does not require separate components and does not adversely affect the flow of exhaust gases through an exhaust passage. Although the present invention has been described with particular detail and illustrated to show a preferred embodiment, it should be understood that alternative embodiments are also within its scope.

I claim:

1. An exhaust system, comprising:
an exhaust conduit connectable in fluid communication with an engine, said exhaust conduit having a central axis;
a wall of said exhaust conduit having an internal surface which is shaped to direct exhaust gases away from said engine; and
a reservoir formed as an integral portion of said exhaust conduit, said reservoir being shaped to receive water which flows under the effect of gravity on said internal surface, said reservoir having an inner wall surface and an outer wall surface, said inner wall surface of said reservoir being displaced radially outward from said internal surface of said exhaust conduit, said internal surface of said exhaust conduit being tapered to extend downward and radially outward from said central axis to form a surface that extends from said internal surface to said outer wall surface, said reservoir being formed in a thickness of said wall of said exhaust conduit.

2. The exhaust system of claim 1, wherein:
said internal surface is generally rectangular in cross section.

3. The exhaust system of claim 2, further comprising:
an exhaust system component attached to said exhaust conduit at a separating plane which is coplanar with a first surface of said exhaust conduit and a second surface of said exhaust system component, said reservoir being disposed in nonintersecting relation with said separating plane.

4. The exhaust system of claim 3, wherein:
said reservoir is annular in shape and coaxial with said central axis.

5. The exhaust system of claim 4, wherein:
said reservoir is displaced radially outward from said internal tubular surface of said tubular exhaust conduit.

* * * * *